United States Patent
Takahashi et al.

(10) Patent No.: US 10,992,219 B2
(45) Date of Patent: Apr. 27, 2021

(54) POWER CONVERSION DEVICE

(71) Applicant: Mitsubishi Electric Corporation, Tokyo (JP)

(72) Inventors: Tatsuya Takahashi, Tokyo (JP); Shigeo Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/613,684

(22) PCT Filed: Jun. 27, 2017

(86) PCT No.: PCT/JP2017/023496
§ 371 (c)(1),
(2) Date: Nov. 14, 2019

(87) PCT Pub. No.: WO2019/003290
PCT Pub. Date: Jan. 3, 2019

(65) Prior Publication Data
US 2021/0091660 A1    Mar. 25, 2021

(51) Int. Cl.
*H02M 1/32* (2007.01)
*H02M 7/483* (2007.01)
(Continued)

(52) U.S. Cl.
CPC .......... *H02M 1/32* (2013.01); *H02M 1/4208* (2013.01); *H02M 7/483* (2013.01); *H02M 7/53871* (2013.01); *H02M 2007/4835* (2013.01)

(58) Field of Classification Search
CPC .... H02M 1/32; H02M 1/4208; H02M 1/4216; H02M 1/4233; H02M 7/02; H02M 7/04;
(Continued)

(56) References Cited

U.S. PATENT DOCUMENTS

| 2011/0074323 A1* | 3/2011 | Mukai | B62D 5/0487 |
| | | | 318/400.21 |
| 2016/0036314 A1 | 2/2016 | Koyanagi et al. | |

(Continued)

FOREIGN PATENT DOCUMENTS

| EP | 3068029 A1 | 9/2016 |
| EP | 3276815 A1 | 1/2018 |

(Continued)

OTHER PUBLICATIONS

International Search Report (PCT/ISA/210), with translation, and Written Opinion (PCT/ISA/237) dated Aug. 29, 2017, by the Japan Patent Office as the International Searching Authority for International Application No. PCT/JP2017/023496.

(Continued)

*Primary Examiner* — Adolf D Berhane
(74) *Attorney, Agent, or Firm* — Buchanan Ingersoll & Rooney PC

(57) ABSTRACT

A power conversion device includes a plurality of cascaded converter cells. In each of the converter cells, each of a plurality of arms forming a bridge circuit is provided with a plurality of semiconductor switching elements in parallel. A drive controller of each of the converter cells is configured to, when none of a plurality of predetermined abnormality modes is detected, control the bridge circuit in accordance with an externally provided command. The drive controller is configured to, when at least one of the plurality of abnormality modes is detected, turn on all semiconductor switching elements provided in at least one of the plurality of arms forming the bridge circuit, to thereby establish a short circuit between first and second input/output nodes.

15 Claims, 11 Drawing Sheets

(51) Int. Cl.
*H02M 7/5387* (2007.01)
*H02M 1/42* (2007.01)

(58) Field of Classification Search
CPC ........ H02M 7/12; H02M 7/155; H02M 7/162; H02M 7/483; H02M 7/53871; H02M 7/5387; H02M 2007/4835; H02M 2007/4822
See application file for complete search history.

(56) References Cited

U.S. PATENT DOCUMENTS

| | | | |
|---|---|---|---|
| 2017/0012521 A1 | 1/2017 | Jimichi et al. | |
| 2017/0163170 A1 | 6/2017 | Tahata et al. | |
| 2017/0291635 A1* | 10/2017 | Yamasaki | H02M 7/003 |
| 2018/0138826 A1 | 5/2018 | Jimichi et al. | |
| 2018/0166994 A1 | 6/2018 | Dorn et al. | |
| 2018/0191238 A1* | 7/2018 | Tsuchiya | H02M 7/12 |
| 2019/0157968 A1* | 5/2019 | Tsuchiya | H02M 7/483 |
| 2019/0181773 A1* | 6/2019 | Kawai | H02M 7/17 |
| 2020/0021185 A1* | 1/2020 | Yamamura | H02M 1/08 |
| 2020/0177097 A1* | 6/2020 | Takahashi | H02M 7/483 |
| 2020/0274461 A1* | 8/2020 | Koikegami | B60R 16/02 |
| 2020/0403277 A1* | 12/2020 | Tsukamoto | H01M 10/4207 |

FOREIGN PATENT DOCUMENTS

| | | |
|---|---|---|
| JP | 2002222920 A | 8/2002 |
| JP | 2006042563 A | 2/2006 |
| JP | 2012010542 A | 1/2012 |
| JP | 2015115977 A | 6/2015 |
| WO | 2013127461 A1 | 9/2013 |
| WO | 2014148100 A1 | 9/2014 |
| WO | 2015121983 A1 | 8/2015 |
| WO | 2015133365 A1 | 9/2015 |
| WO | 2016152989 A1 | 9/2016 |
| WO | 2016167117 A1 | 10/2016 |
| WO | 2016188589 A1 | 12/2016 |

OTHER PUBLICATIONS

Notice of Reasons for Refusal dated Feb. 9, 2018, by the Japan Patent Office for Application No. 2017-567479.
Extended European Search Report dated Jun. 10, 2020 issued by the European Patent Office in corresponding European Patent Application No. 17915832.4 (8 pages).
European Office Action dated Jan. 21, 2021 issued by the European Patent Office in corresponding European Patent Application No. 17915832.4 (5 pages).

* cited by examiner

POWER CONVERSION DEVICE

TECHNICAL FIELD

The present disclosure relates to a self-excited power conversion device formed of a plurality of cascaded converter cells, which is suitably used for, for example, high-voltage DC power transmission, a frequency converter, and a reactive power compensation device.

BACKGROUND ART

A modular multilevel converter (MMC) is known as a large-capacity power conversion device connected to an electric power system. The modular multilevel converter includes, for each phase of AC, an upper arm circuit connected to a high-potential-side DC terminal and a lower arm circuit connected to a low-potential-side DC terminal. Each arm circuit is formed of a plurality of cascaded converter cells.

The converter cells are hereinafter also referred to as sub-modules.

A converter cell includes a capacitor serving as an energy storage device, first and second input/output nodes, and a bridge circuit for switching between connection and disconnection between these input/output nodes and the capacitor. The bridge circuit used is of half-bridge-type, full-bridge-type or the like.

When a failure occurs for some reason in one of converter cells forming each arm circuit of an MMC, the entire MMC stops operating normally. In order to avoid such inconvenience, a bypass switch is provided in parallel with each converter cell (see paragraph 0003 of WO 2014/148100 (PTL 1), for example). In the event of a failure in a converter cell, the parallel-connected bypass switch is turned on to short-circuit the output of this converter cell. Operation of the MMC can thereby be continued.

CITATION LIST

Patent Literature

PTL 1: WO 2014/148100

SUMMARY OF INVENTION

Technical Problem

The inventors of the present application are developing an MMC having an increased current capacity by providing each arm of a bridge circuit forming a converter cell with two or more semiconductor switching elements in parallel. Additional provision of a bypass switch as described in the reference above for an MMC thus configured involves increased volume of the converter cell and increased cost.

In view of the problem described above, an object of the present disclosure is to provide a power conversion device capable of suppressing the volume of a cell converter and the cost.

Solution to Problem

A power conversion device in one embodiment includes a plurality of cascaded converter cells. Each of the converter cells includes a first input/output node, a second input/output node, an energy storage device, a bridge circuit, and a drive controller. The bridge circuit is provided for switching between connection and disconnection between the first and second input/output nodes and the energy storage device. Of a plurality of arms forming the bridge circuit, each arm provided with at least one semiconductor switching element includes a plurality of semiconductor switching elements connected in parallel. The drive controller is configured to, when none of a plurality of predetermined abnormality modes is detected, control the bridge circuit in accordance with an externally provided command. The drive controller is configured to, when at least one of the plurality of abnormality modes is detected, turn on all semiconductor switching elements provided in at least one of the plurality of arms forming the bridge circuit, to thereby establish a short circuit between the first and second input/output nodes.

Advantageous Effects of Invention

According to the embodiment, the semiconductor switching elements forming the bridge circuit can be used instead of a conventional bypass switch, and therefore, the volume of the cell converter and the cost can be suppressed. In the embodiment, each arm of the bridge circuit is provided with the plurality of semiconductor switching elements in parallel. Thus, the possibility of simultaneous open circuit failure of all of these plurality of semiconductor switching elements is low.

DESCRIPTION OF EMBODIMENTS

Figure 1:
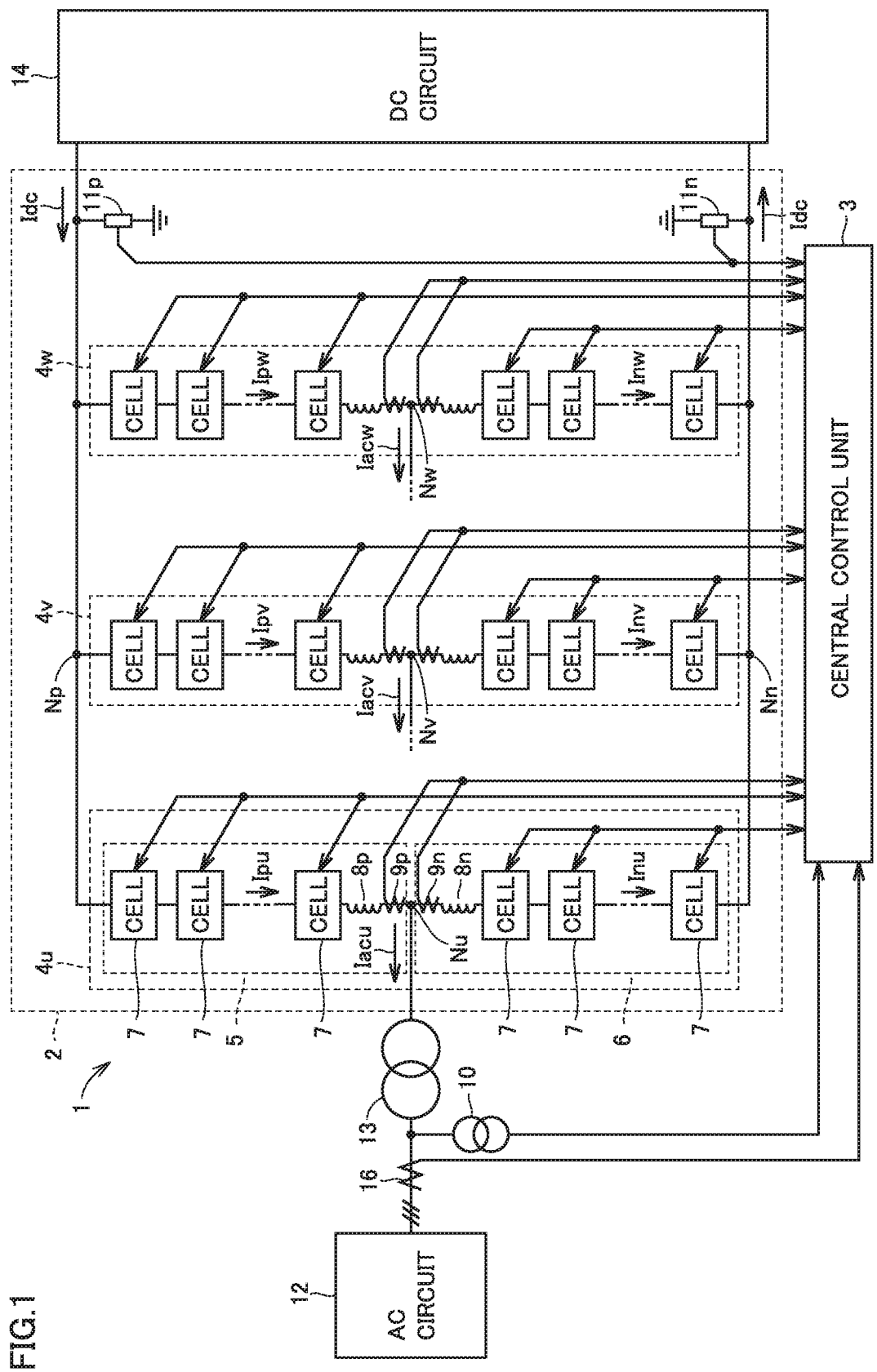
FIG. 1 shows a schematic configuration example of a power conversion device in a first embodiment.

In the following, each embodiment is described in detail with reference to the drawings. The same or corresponding parts are denoted by the same reference characters, and a description thereof is not repeated.

First Embodiment

[Schematic Configuration of Power Conversion Device]

FIG. 1 shows a schematic configuration example of a power conversion device in a first embodiment. Referring to FIG. 1, a power conversion device 1 includes leg circuits 4u, 4v, 4w (which may be referred to non-specifically as leg circuit 4) that are main circuits, and a central control unit 3. The whole of leg circuits 4u, 4v, 4w is referred to as power conversion circuitry 2 in the present embodiment.

Leg circuit 4 is provided for each of a plurality of phases of AC, and connected between an AC circuit 12 and a DC circuit 14 for performing power conversion between the AC circuit and the DC circuit. AC circuit 12 shown in FIG. 1 is a three-phase AC circuit, and three leg circuits 4u, 4v and 4w are provided for U phase, V phase and W phase, respectively.

AC terminals Nu, Nv, Nw provided respectively in leg circuits 4u, 4v, 4w are each connected through an interconnection transformer 13 to AC circuit 12. AC circuit 12 is an AC power system including an AC power supply, for example. FIG. 1 does not show connection between AC terminals Nv, Nw and interconnection transformer 13 for the sake of simplifying the drawing.

DC terminals Np, Nn (i.e., high-potential-side DC terminal Np, low-potential-side DC terminal Nn) that are provided commonly to leg circuits 4 are connected to DC circuit 14. DC circuit 14 corresponds to a connection terminal for a DC power system in a high voltage direct current (HVDC) system in FIG. 4 which will be described later, or a connection terminal for another power conversion device in a BTB (Back To Back) system in FIG. 5.

Figure 2:
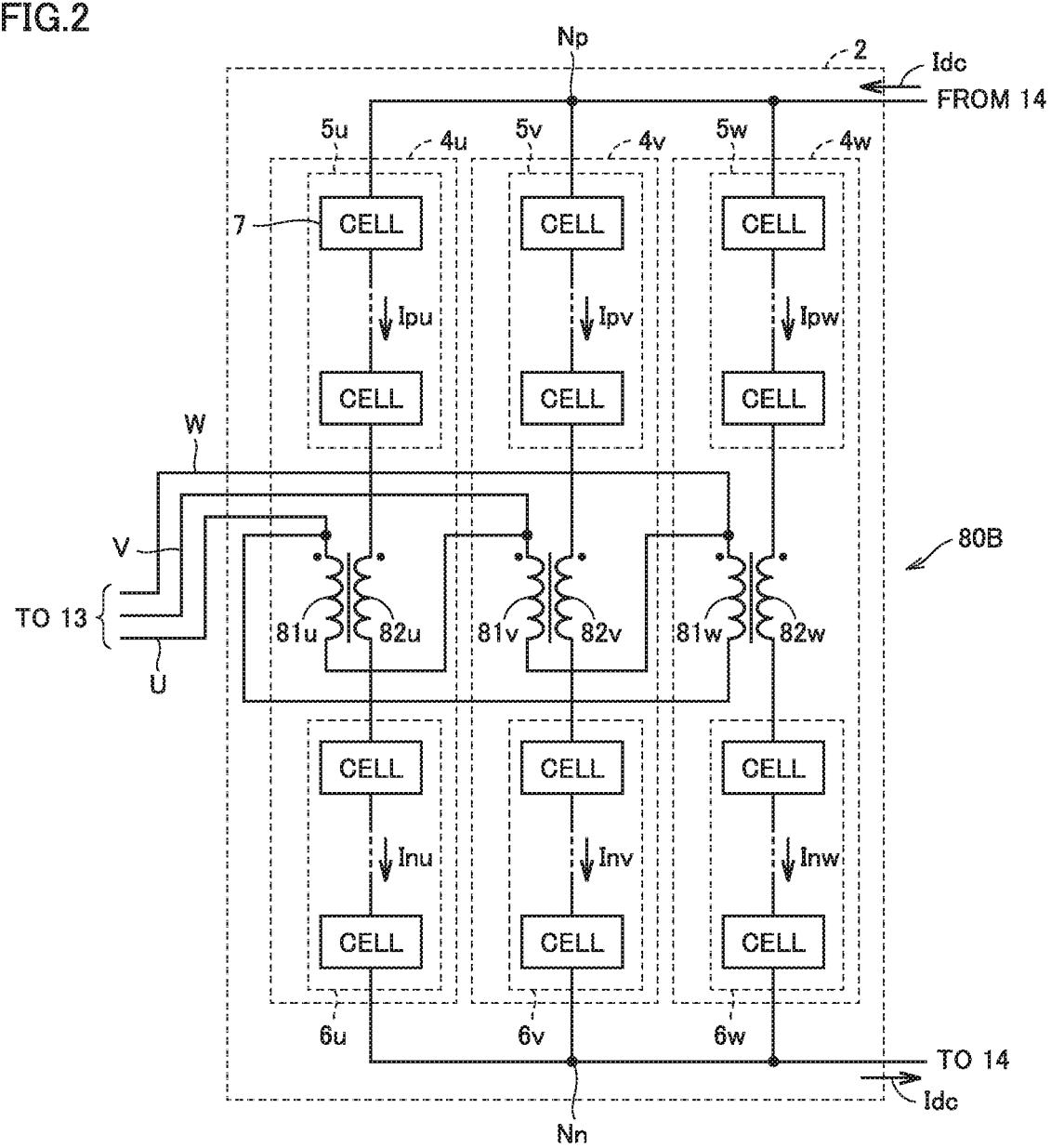
FIG. 2 shows a variation of a connecting part between an AC circuit and each leg circuit.
Figure 3:
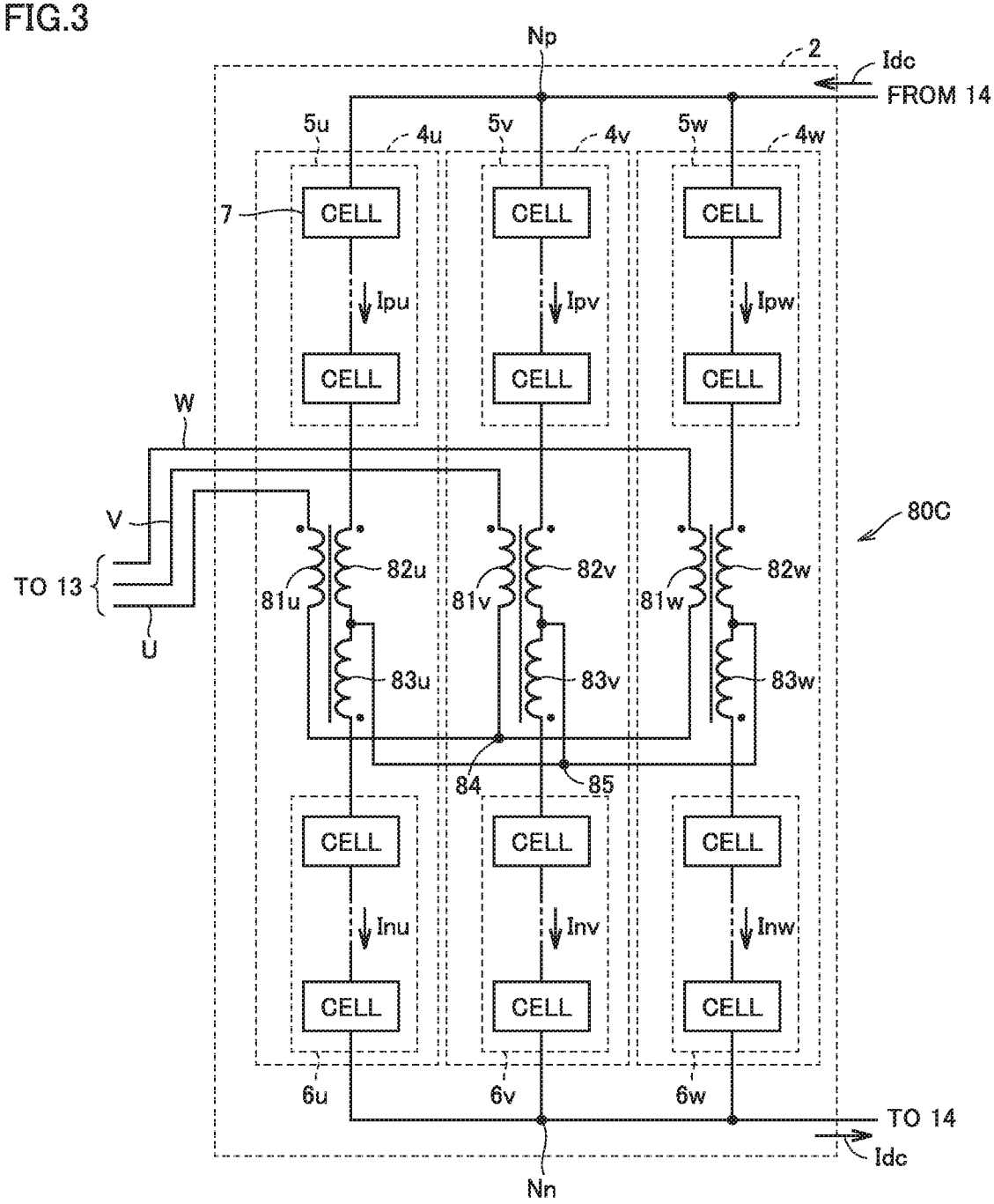
FIG. 3 shows another variation of a connecting part between the AC circuit and each leg circuit.

The leg circuits may be connected to AC circuit 12 through an interconnection reactor, instead of interconnection transformer 13 in FIG. 1. AC connection between AC circuit 12 and each leg circuit 4 may be implemented as shown in FIGS. 2 and 3.

A detailed configuration of a connecting part between AC circuit 12 and each leg circuit 4 in this case will be described later.

Leg circuit 4u is divided into an upper arm circuit 5 from high-potential-side DC terminal Np to AC terminal Nu, and a lower arm circuit 6 from low-potential-side DC terminal Nn to AC terminal Nu. The connection point (i.e., AC terminal Nu) between upper arm circuit 5 and lower arm circuit 6 is connected to transformer 13. High-potential-side DC terminal Np and low-potential-side DC terminal Nn are connected to DC circuit 14. Leg circuits 4v, 4w have a similar configuration to the above-described one, and therefore, leg circuit 4u is explained below as a representative of the leg circuits.

Upper arm circuit 5 includes a plurality of cascaded converter cells 7, and a reactor 8p. The plurality of converter cells 7 and reactor 8p are connected in series with each other. Converter cell 7 may be hereinafter referred to as cell 7 for the sake of simplicity.

Likewise, lower arm circuit 6 includes a plurality of cascaded cells 7, and a reactor 8n. The plurality of cells 7 and reactor 8n are connected in series with each other.

Reactors 8p, 8n are provided for preventing a sharp change in arm currents Ipu, Ipn at the moment of a sharp change in output voltage when the cells in the leg circuit are turned on or off, or in the event of a fault in AC circuit 12 or DC circuit 14. The position in which reactor 8p is inserted may be any position in upper arm circuit 5 of leg circuit 4u, and the position in which reactor 8n is inserted may be any position in lower arm circuit 6 of leg circuit 4u. More than one reactors 8p and more than one reactors 8n may be provided. Respective inductance values of the reactors may be different from each other. Alternatively, only reactor 8p of upper arm circuit 5, or only reactor 8n of lower arm circuit 6 may be provided.

Power conversion device 1 in FIG. 1 further includes, as detectors for measuring the amount of electricity (current, voltage, for example) to be used for control, an AC voltage detector 10, an AC current detector 16, DC voltage detectors 11p, 11n, and arm current detectors 9p, 9n provided in each leg circuit 4.

Specifically, AC voltage detector 10 detects voltage values of U phase, V phase, W phase of AC circuit 12. AC current detector 16 detects current values Iacu, Iacv, Iacw of U phase, V phase, W phase of AC circuit 12. DC voltage detector 11p detects the voltage of high-potential-side DC terminal Np connected to DC circuit 14. DC voltage detector 11n detects the voltage of low-potential-side DC terminal Nn connected to DC circuit 14.

Arm current detectors 9p, 9n provided in U phase leg circuit 4u detect arm current Ipu flowing in upper arm circuit 5 and an arm current Inu flowing in lower arm circuit 6, respectively. Likewise, arm current detectors 9p, 9n provided in V phase leg circuit 4v detect an upper arm current Ipv and a lower arm current Inv, respectively. Arm current detectors 9p, 9n provided in W phase leg circuit 4w detect an upper arm current Ipw and a lower arm current Inw, respectively. Based on these arm currents, a DC current Idc flowing through DC circuit 14 and a circulating current circulating through each leg circuit can be calculated.

Signals detected by the above-described detectors are input to central control unit 3. Central control unit 3 further receives, from each cell 7, a signal representing a detected value of the cell capacitor voltage. Based on the detected signal from each of the above-described detectors and information about the cell capacitor voltage, central control unit 3 outputs, to each cell 7, a control command for controlling the operating state of each cell 7, and an operation/stop command (operation command or stop command) for protecting each cell 7.

For the sake of simplifying the drawing, FIG. 1 shows collectively some of signal lines for signals that are input from respective detectors to central control unit 3 and signal lines for signals that are transmitted between central control unit 3 and respective cells 7. Actually, however, the signal line is provided individually for each detector and each cell 7. The signal line between each cell 7 and central control unit 3 may be provided as separate transmission line and reception line. In the case of the present embodiment, these signal lines are formed of optical fibers for the sake of noise immunity.

Although not shown in FIG. 1, each of arm circuits 5, 6 may be provided with a plurality of bypass circuits. In this case, the plurality of converter cells 7 forming each arm circuit are divided into a plurality of blocks, and a bypass circuit is provided for each block. The bypass circuit serves to protect power conversion circuitry 2 by passing a fault current at a time of failure of the DC circuit, and is formed of diodes connected in series such that the direction from low-potential-side DC terminal Nn to high-potential-side DC terminal Np is the forward direction, for example.

It should be noted that the bypass circuit is different from the bypass switch described in BACKGROUND ART. As was already explained, the bypass switch is provided for establishing a short circuit between the output terminals of converter cell 7 at a time of failure of converter cell 7 itself. Power conversion device 1 in the present embodiment is characterized in that the bypass switch is not connected between the input/output terminals of each converter cell 7.

[Variations of Connecting Part Between AC Circuit and Each Leg Circuit]

In the example shown in FIG. 1, DC connection between AC circuit 12 and power conversion circuitry 2 is implemented through AC terminals Nu, Nv, Nw provided respectively in leg circuits 4u, 4v, 4w. Alternatively, AC connection between AC circuit 12 and each leg circuit 4 may be implemented through a transformer. Some specific examples will be described with reference to FIGS. 2 and 3.

FIG. 2 shows a variation of a connecting part between the AC circuit and each leg circuit. Referring to FIG. 2, AC circuit 12 and leg circuits 4u, 4v, 4w are connected to each other through a three-phase transformer 80B.

As shown in FIG. 2, three-phase transformer 80B includes primary windings 81u, 81v, 81w which are Δ-connected. Specifically, primary winding 81u of three-phase transformer 80B is connected between U phase and V phase of AC circuit 12. Primary winding 81v of three-phase transformer 80B is connected between V phase and W phase of AC circuit 12. Primary winding 81w of three-phase transformer 80B is connected between W phase and U phase of AC circuit 12.

Secondary windings 82u, 82v, 82w of three-phase transformer 80B are magnetically coupled with primary windings 81u, 81v, 81w, respectively, through a common core. Further, secondary winding 82u is connected in series with U phase arm circuits 5u, 6u, secondary winding 82v is connected in series with V phase arm circuits 5v, 6v, and secondary winding 82w is connected in series with W phase arm circuits 5w, 6w.

In the case of FIG. 2, each of secondary windings 82u, 82v, 82w also serves as reactors 8p, 8n of each phase. Secondary windings 82u, 82v, 82w of three-phase transformer 80B may be provided in addition to reactors 8p, 8n.

DC magnetic flux generated in the core can be canceled by passing a DC component through Δ-connected primary windings 81u, 81v, 81w.

FIG. 3 shows another variation of a connecting part between the AC circuit and each leg circuit. Referring to FIG. 3, AC circuit 12 and leg circuits 4u, 4v, 4w are connected to each other through a three-winding, three-phase transformer 80C.

Specifically, primary windings 81u, 81v, 81w of three-phase transformer 80C in FIG. 3 have one ends connected to U phase, V phase and W phase transmission lines of AC circuit 12, respectively, through interconnection transformer 13. Primary windings 81u, 81v, 81w of three-phase transformer 80C have the other ends connected to a common neutral point 84. Namely, in the case of FIG. 3, primary windings 81u, 81v, 81w are Y-connected.

Secondary windings 82u, 82v, 82w of three-phase transformer 80C are magnetically coupled with primary windings 81u, 81v, 81w, respectively, through a common core. Three-phase transformer 80C in FIG. 3 is further provided with tertiary windings 83u, 83v, 83w connected in series with secondary windings 82u, 82v, 82w, respectively. The secondary winding and its corresponding tertiary winding of each phase are connected to be opposite in polarity, and are wound around the common core. The connection point between the secondary winding and its corresponding tertiary winding of each phase is connected to a common neutral point 85.

Further, secondary winding 82u and tertiary winding 83u are connected in series with U phase arm circuits 5u, 6u. Secondary winding 82v and tertiary winding 83v are connected in series with V phase arm circuits 5v, 6v. Secondary winding 82w and tertiary winding 83w are connected in series with W phase arm circuits 5w, 6w. In the case of FIG. 3, each of secondary windings 82u, 82v, 82w and each of tertiary windings 83u, 83v, 83w also serve as reactors 8p, 8n of each phase. Secondary windings 82u, 82v, 82w and tertiary windings 83u, 83v, 83w of three-phase transformer 80C may be provided in addition to reactors 8p, 8n.

Three-phase transformer 80C in FIG. 3 has the advantage of preventing the generation of DC magnetic flux in the core, since a DC electromotive force generated in the secondary winding and an electromotive force generated in the tertiary winding due to the arm currents of each phase (U phase: Ipu, Inu, V phase: Ipv, Inv, W phase: Ipw, Inw) cancel each other out.

[Configuration Example of HVDC System]

Figure 4:
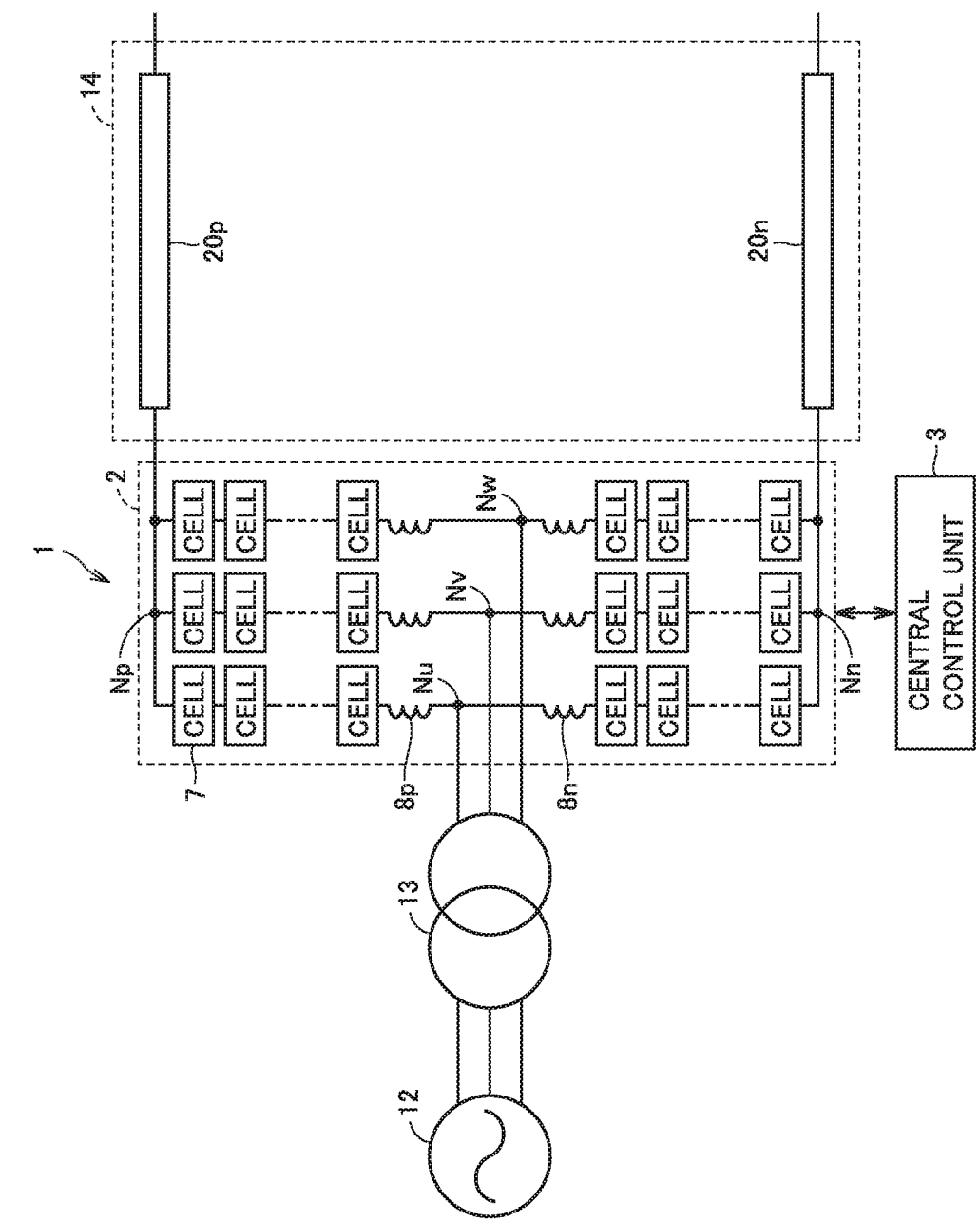
FIG. 4 shows a schematic configuration example of an HVDC system employing the power conversion device in FIG. 1.

FIG. 4 shows a schematic configuration example of an HVDC system employing the power conversion device in FIG. 1.

A high voltage direct current (HVDC) system serves to perform DC long-distance power transmission after converting high-voltage AC power into DC power. As shown in FIG. 4, power conversion device 1 illustrated in FIG. 1 is utilized for the AC/DC conversion. High-potential-side DC terminal Np of power conversion device 1 is connected to a high-potential-side transmission line 20p, and low-potential-side DC terminal Nn of power conversion device 1 is connected to low-potential-side transmission line 20n. A DC power system including transmission lines 20p, 20n corresponds to DC circuit 14 in FIG. 1.

The configuration of the HVDC system in FIG. 4 is given as an example, and is not limited to this example. For example, the connecting part between AC circuit 12 and each leg circuit 4 may be three-phase transformers 80B, 80C as illustrated in FIGS. 2 and 3.

[Configuration Example of BTB System]

Figure 5:
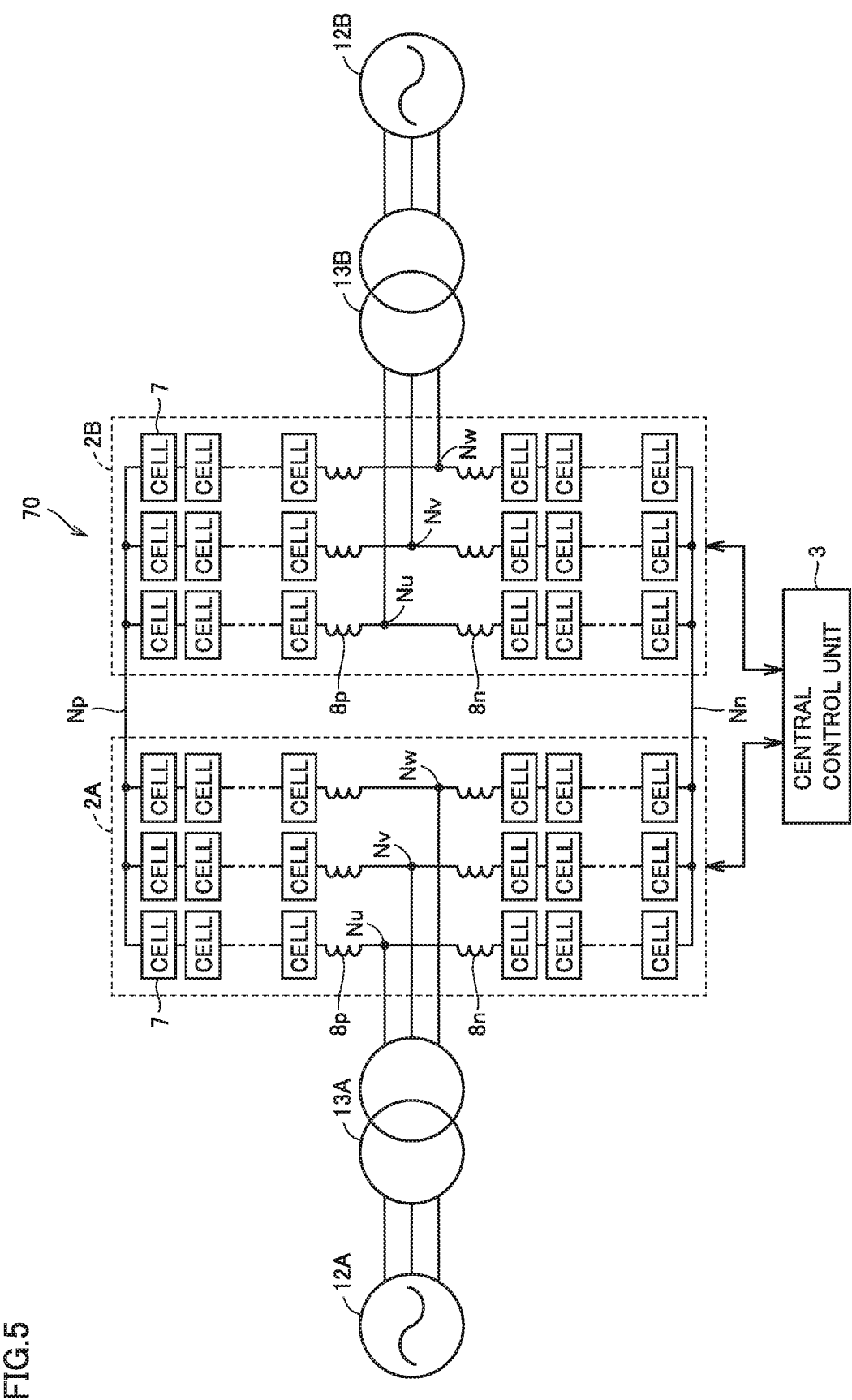
FIG. 5 shows a schematic configuration example of a BTB system employing the power conversion device in FIG. 1.

FIG. 5 shows a schematic configuration example of a BTB system employing the power conversion device in FIG. 1.

A BTB (Back To Back) system serves to interchange power between two AC circuits by performing rectification of converting AC into DC, and inversion of converting DC into AC. Power conversion device 1 illustrated in FIG. 1 is utilized for the rectification and inversion.

Referring specifically to FIG. 5, a BTB system 70 includes power conversion circuitry 2A, 2B sharing high-potential-side DC terminal Np and low-potential-side DC terminal Nn, and central control unit 3 for controlling power conversion circuitry 2A, 2B. AC terminals Nu, Nv, Nw of power conversion circuitry 2A are connected to an AC circuit 12A (AC power system) through an interconnection transformer 13A. AC terminals Nu, Nv, Nw of power conversion circuitry 2B are connected to an AC circuit 12B (AC power system) through an interconnection transformer 13B. High-potential-side DC terminal Np and low-potential-side DC terminal Nn shared by power conversion circuitry 2A, 2B correspond to DC circuit 14 of power conversion device 1.

The configuration of BTB system 70 in FIG. 5 is given as an example, and is not limited to this example. For example, the connecting part between AC circuit 12A and each leg circuit of power conversion circuitry 2A and the connecting part between AC circuit 12B and each leg circuit of power conversion circuitry 2B may be three-phase transformers 80B, 80C as illustrated in FIGS. 2 and 3.

[Configuration of Converter Cell]

Figure 6:
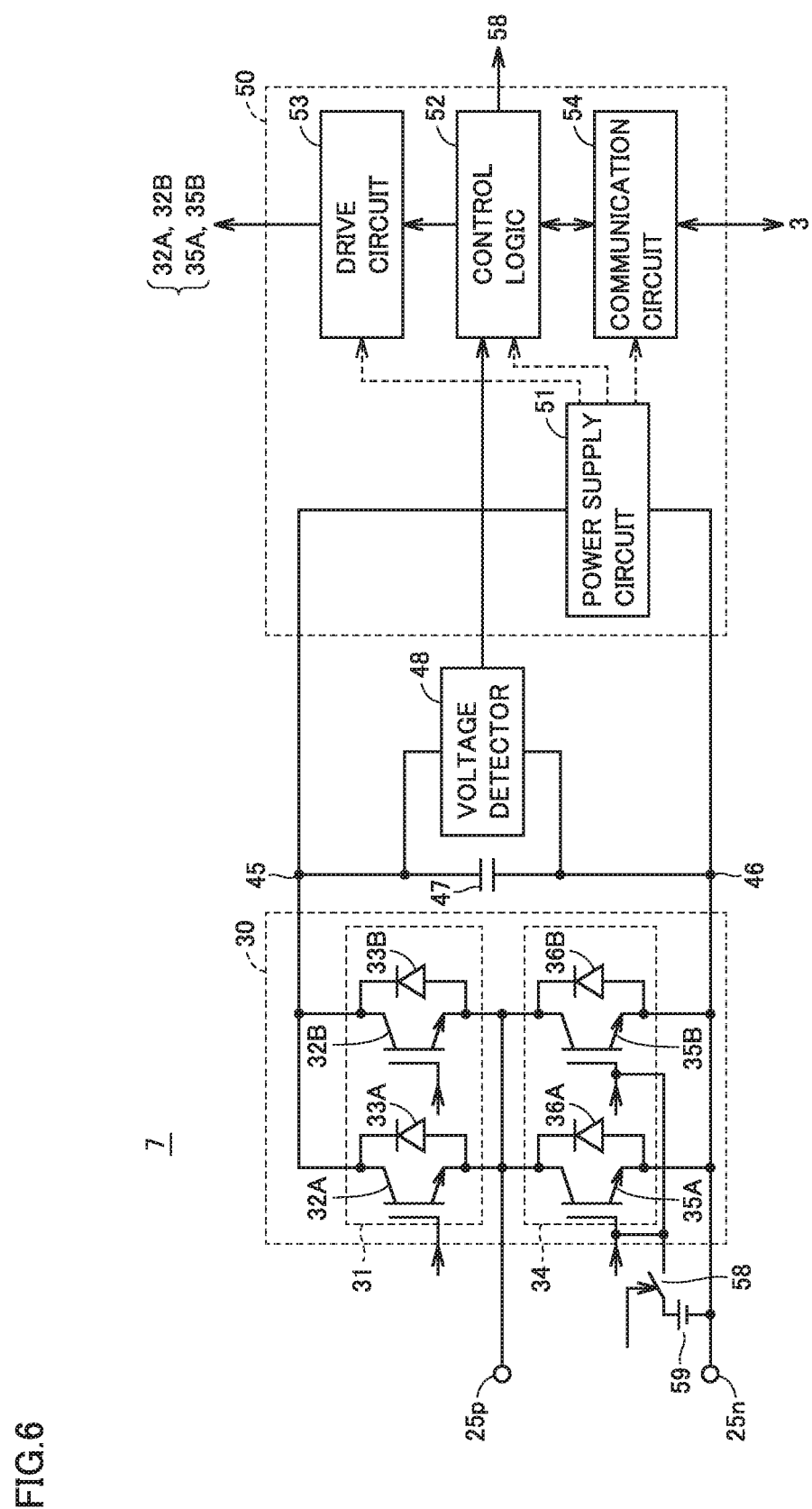
FIG. 6 shows an example of a converter cell forming each leg circuit in FIG. 1.

FIG. 6 shows an example of a converter cell forming each leg circuit in FIG. 1. Converter cell 7 shown in FIG. 6 includes a first input/output node 25p, a second input/output node 25n, a half-bridge-type bridge circuit 30, a DC capacitor 47 serving as an energy storage device, a drive controller 50, a voltage detector 48, a latch-type switch 58, and a battery 59. Battery 59 is also referred to as a battery power supply.

Input/output node 25p is connected to input/output node 25n of adjacent converter cell 7 on the side closer to high-potential-side DC terminal Np. Input/output node 25p of converter cell 7 disposed closest to high-potential-side DC terminal Np is connected to high-potential-side DC terminal Np. Likewise, input/output node 25n is connected to input/output node 25p of adjacent converter cell 7 on the side closer to low-potential-side DC terminal Nn. Input/output node 25n of converter cell 7 disposed closest to low-potential-side DC terminal Nn is connected to low-potential-side DC terminal Nn.

Half-bridge-type bridge circuit 30 includes a first arm 31 connected between a positive side node 45 of DC capacitor 47 and input/output node 25p, and a second arm 34 connected between a negative side node 46 of DC capacitor 47 and input/output node 25p. Input/output node 25n is directly connected to node 46.

First arm 31 includes semiconductor switching elements 32A, 32B (which may be hereinafter referred to simply as switching elements) connected in parallel with each other, and diodes 33A, 33B. Diodes 33A, 33B are connected in anti-parallel (i.e., in parallel in the reverse-bias direction) with switching elements 32A, 32B, respectively. Likewise, second arm 34 includes semiconductor switching elements 35A, 35B connected in parallel with each other, and diodes 36A, 36B. Diodes 36A, 36B are connected in anti-parallel with switching elements 35A, 35B, respectively.

While each arm of bridge circuit 30 is provided with two semiconductor switching elements in parallel in the example of FIG. 6, each arm may be provided with more than two semiconductor switching elements in parallel.

As semiconductor switching elements 32A, 32B, 35A, 35B, a self-excited semiconductor switching element such as an IGBT (Insulated Gate Bipolar Transistor) or a GCT (Gate Commutated Turn-off thyristor) is used, for example.

Voltage detector 48 detects a DC voltage held by DC capacitor 47. DC capacitor 47 is a direct current voltage transformer (DCVT), for example. In the following description, the voltage of DC capacitor 47 is also referred to as cell capacitor voltage.

Drive controller 50 includes a power supply circuit 51, a control logic 52, a drive circuit 53, and a communication circuit 54. These respective elements may be formed on separate circuit boards, or at least some of these elements may be formed on a common circuit board. Control logic 52 may be implemented as a dedicated circuit, or implemented using an FPGA (Field Programmable Gate Array). Alternatively, the functions of control logic 52 may be implemented by a microcomputer including a CPU (Central Processing Unit), a memory and the like.

Power supply circuit 51 generates, based on the voltage stored in DC capacitor 47, drive voltages of various magnitudes for use in control logic 52, drive circuit 53, communication circuit 54 and the like in converter cell 7. Therefore, it is not until the electric charge is stored in DC capacitor 47 at a time of activation of power conversion device 1 that power supply circuit 51 starts operating, causing operation of the other circuits forming drive controller 50.

Communication circuit 54 conducts communication with a communication circuit provided in central control unit 3. An optical fiber is used for this communication for the sake of noise immunity. Drive circuit 53 generates gate drive signals for semiconductor switching elements 32A, 32B, 35A, 35B based on an ON/OFF command from control logic 52.

Control logic 52 controls ON/OFF of semiconductor switching elements 32A, 32B, 35A, 35B based on the control command and the operation/stop command received from central control unit 3 through communication circuit 54. The ON/OFF signal from control logic 52 is amplified by drive circuit 53 to generate the gate drive signals. Control logic 52 further transmits, to central control unit 3, information about the voltage of DC capacitor 47 detected by voltage detector 48.

Further, control logic 52 is configured to sense, using a plurality of sensors not shown in the figure, a plurality of abnormality modes in converter cell 7. The following abnormality detections are performed, for example. The abnormality modes are not limited to the following.

(i) It is detected whether or not the voltage of DC capacitor 47 detected by voltage detector 48 is within a predetermined appropriate range. When the DC capacitor voltage is lower than the appropriate range or when the DC capacitor voltage is higher than the appropriate range, a failure is suspected in which switching operation of any one of semiconductor switching elements 32A, 32B, 35A, 35B is not being properly performed.

(ii) It is detected whether or not communication is being normally conducted through communication circuit 54. For example, a stop of communication from central control unit 3, and an error in an error detection code included in a signal received from central control unit 3 are sensed.

(iii) It is detected whether or not the voltage generated by power supply circuit 51 is within a set voltage range.

(iv) It is detected whether or not a voltage consistent with the ON/OFF command output from control logic 52 is being output from drive circuit 53.

When at least one of the plurality of predetermined abnormality modes is detected, control logic 52 performs control of turning on (i.e., closing) all of semiconductor switching elements 35A, 35B forming second arm 34 to thereby establish a short circuit between input/output nodes 25p and 25n. Specifically, control logic 52 turns on (i.e., closes) switch 58 to thereby apply a voltage output from battery 59 to the gates of semiconductor switching elements 35A, 35B. Switch 58 is desirably a latch-type switch that is maintained in the ON state without a supply of a drive signal from control logic 52. Accordingly, semiconductor switching elements 35A, 35B can be maintained in the ON state even when power supply circuit 51 stops operating due to discharge of the voltage of DC capacitor 47 after a short circuit has been established between input/output nodes 25p and 25n.

Converter cell 7 in FIG. 6 is characterized in that a bypass switch conventionally required to establish a short circuit between input/output nodes 25p and 25n is not provided. By turning on semiconductor switching elements 35A, 35B forming second arm 34, the same effect as that obtained by conventionally turning on a bypass switch can be provided. In converter cell 7 of the present embodiment, second arm 34 is provided with two semiconductor switching elements 35A, 35B in parallel. Thus, the possibility of simultaneous failure of both of these semiconductor switching elements 35A, 35B is very low. Accordingly, semiconductor switching elements 35A, 35B can be used instead of the bypass switch. Semiconductor switching elements 35A, 35B consume power mainly in the form of conduction loss and switching loss. Since there is no switching loss when semiconductor switching elements 35A, 35B are always ON, power consumption does not pose a problem.

Each of arm circuits 5, 6 forming power conversion device 1 is provided with one or more redundant converter cells 7. Accordingly, power conversion device 1 does not have an operational problem when a short circuit is established between input/output nodes 25p and 25n of converter cell 7 in an abnormality mode.

[Operation of Converter Cell and Power Conversion Device]

Next, operation of converter cell 7 and operation of power conversion device 1 associated with an abnormality mode of converter cell 7 will be described. First, the operating states of converter cell 7 include the following three operating states.

(1) The case where an abnormality mode of converter cell 7 is not detected, and the control command is received from central control unit 3.

In this case, control logic 52 controls, in accordance with the control command received from central control unit 3, semiconductor switching elements 32A, 32B, 35A, 35B such that one of first arm 31 and second arm 34 is brought into conduction and the other is brought into non-conduction. For example, the control command is a voltage command value for each arm, and each converter cell 7 controls semiconductor switching elements 32A, 32B, 35A, 35B so as to output a zero voltage or the cell capacitor voltage depending on the voltage command value.

Specifically, while switching elements 32A, 32B forming first arm 31 are in the ON state and switching elements 35A, 35B forming second arm 34 are in the OFF state, a voltage across DC capacitor 47 is applied between input/output nodes 25p and 25n. On the contrary, while switching elements 32A, 32B forming first arm 31 are in the OFF state and switching elements 35A, 35B forming second arm 34 are in the ON state, the voltage between input/output nodes 25p and 25n is 0 V.

Thus, converter cell 7 shown in FIG. 6 can cause switching elements 32A, 32B forming first arm 31 and switching elements 35A, 35B forming second arm 34 to become the ON state alternately, to thereby output a zero voltage or a positive voltage depending on the voltage of DC capacitor 47.

(2) The case where an abnormality mode of converter cell 7 is not detected, and the stop command is received from central control unit 3.

For example, when it is detected that the arm current is overcurrent, central control unit 3 in FIG. 1 outputs the stop command to each converter cell 7. In this case, control logic 52 turns off all of semiconductor switching elements 32A, 32B, 35A, 35B forming first arm 31 and second arm 34 for the sake of circuit protection.

(3) The case where an abnormality mode of converter cell 7 is detected. In this case, control logic 52 turns on (i.e., closes) switch 58 to thereby apply the voltage output from battery 59 to semiconductor switching elements 35A, 35B. As a result, all of semiconductor switching elements 35A, 35B forming second arm 34 are turned on, and a short circuit is thereby established between input/output nodes 25p and 25n.

Figure 7:
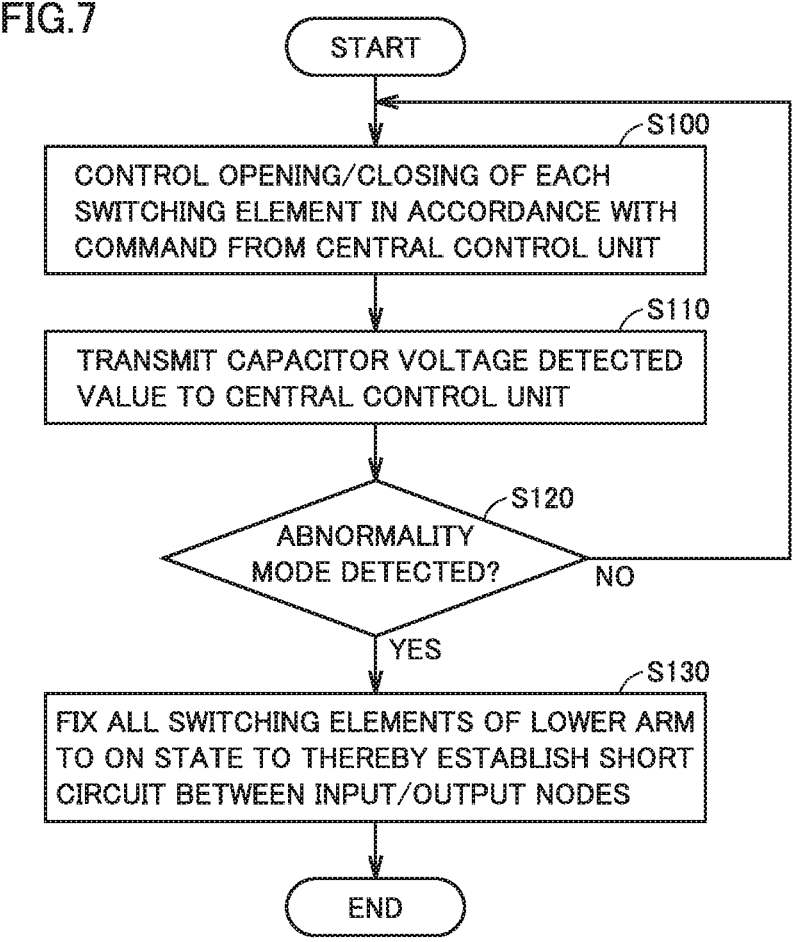
FIG. 7 is a flowchart showing operation of the converter cell.

FIG. 7 is a flowchart showing operation of the converter cell. The description thus far will be summarized with reference to FIGS. 6 and 7.

When none of the plurality of abnormality modes of converter cell 7 is detected (NO in step S120), in step S100, control logic 52 controls each of semiconductor switching elements 32A, 32B, 35A, 35B in accordance with the control command and the operation/stop command from central control unit 3. Further, in this case, in step S110, control logic 52 transmits information about a detected value of the voltage of DC capacitor 47 to central control unit 3.

When at least one of the plurality of abnormality modes of converter cell 7 is detected (YES in step S120), on the other hand, in step S130, control logic 52 turns on all switching elements provided in lower arm 34 forming bridge circuit 30, to thereby establish a short circuit between first and second input/output nodes 25p and 25n. Accordingly, operation of the MMC can be continued using converter cells other than the failed cell.

It should be noted that the determination of which arm should have all of its switching elements turned on in order to establish a short circuit between first and second input/output nodes 25p and 25n may vary depending on the configuration of the bridge circuit. For example, in the case of a full-bridge type in FIG. 9 which will be described later, all switching elements of lower second arm 34 and fourth arm 40 may be turned on, or all switching elements of upper first arm 31 and third arm 37 may be turned on. Thus, more generally, when at least one of the plurality of abnormality modes of converter cell 7 is detected (YES in step S120), control logic 52 turns on all switching elements of at least one arm, which is required to establish a short circuit between first and second input/output nodes 25p and 25n, of the plurality of arms forming the bridge circuit.

Next, the control of power conversion device 1 associated with an abnormality mode of each converter cell 7 is described. As was already explained, each of arm circuits 5, 6 forming power conversion device 1 is provided with a predetermined number of redundant converter cells 7.

Figure 8:
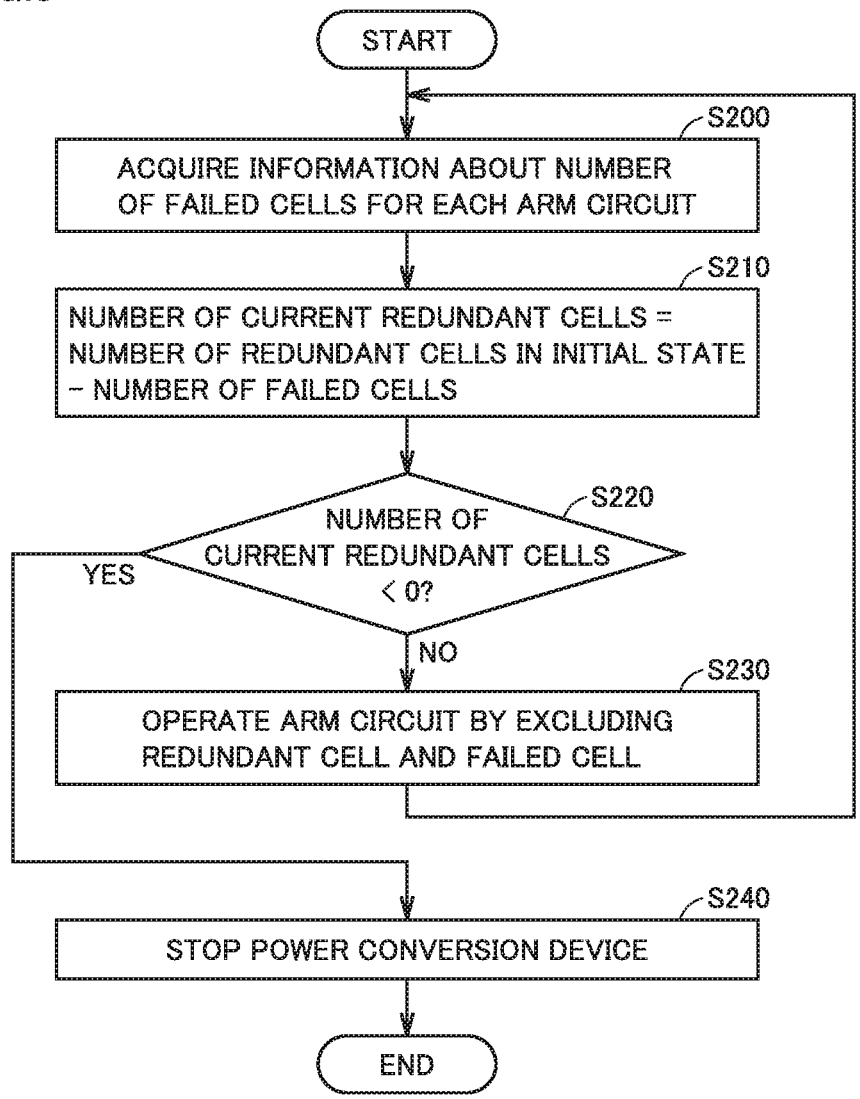
FIG. 8 is a flowchart showing operation of a central control unit associated with the detection of an abnormality mode.

FIG. 8 is a flowchart showing operation of the central control unit associated with the detection of an abnormality mode. Referring to FIGS. 1, 6 and 8, in step S200, central control unit 3 acquires information about the number of failed cells (i.e., the number of cells which have been short-circuited between input/output nodes 25p and 25n due to the detection of an abnormality mode) for each arm circuit.

In the next step S210, central control unit 3 subtracts the number of failed cells from the number of redundant cells in an initial state to thereby calculate the number of current redundant cells. When the number of current redundant cells is smaller than 0, namely, when the number of failed cells exceeds an initial value of the number of redundant cells (YES in step S220), central control unit 3 stops operation of power conversion device 1 in step S240. Specifically, the central control unit opens both an AC circuit breaker (not shown) between the power conversion device and AC circuit 12 and a DC circuit breaker (not shown) between the power conversion device and DC circuit 14, and controls each converter cell 7 such that all of semiconductor switching elements 32A, 32B, 35A, 35B provided in each converter cell 7 forming power conversion circuitry 2 are turned off.

When the number of current redundant cells is equal to or greater than 0 (NO in step S220), on the other hand, in step S230, central control unit 3 causes each of arm circuits 5, 6 to operate by converter cells 7 excluding the current redundant cell and the failed cell. In this case, central control unit 3 may output the control command to the current redundant cell such that switching elements 35A, 35B forming second arm 34 are always in the ON state. Alternatively, central control unit 3 may output a voltage command value corresponding to the number of effective cells excluding the number of current redundant cells and the number of failed cells (the number of effective cells is constant irrespective of the number of failed cells) as the control command to each of arm circuits 5, 6. Based on this voltage command value, control logic 52 of converter cell 7 corresponding to the redundant cell causes switching elements 35A, 35B forming second arm 34 to be always in the ON state.

[Effects]

As described above, according to power conversion device 1 in the first embodiment, each arm of bridge circuit 30 forming each converter cell 7 is provided with two or more semiconductor switching elements 32 in parallel. Thus, current capacity of power conversion device 1 can be increased, and switching elements 35A, 35B forming the lower arm (i.e., second arm 34) of bridge circuit 30 can be used instead of a bypass switch. This is because the possibility of simultaneous failure of all of switching elements 35A, 35B forming second arm 34 is low. As a result, the volume of converter cell 7 and the cost can be suppressed.

Second Embodiment

In the first embodiment, each converter cell 7 is formed of half-bridge-type bridge circuit 30. In the following, each converter cell 7 formed of a full-bridge-type or three-quarter-type bridge circuit is described. Either circuit configuration produces similar effects to those of the first embodiment. In the following, the differences from the first embodiment are mainly described, and similarities are not described repeatedly.

[Configuration of Full-Bridge-Type Bridge Circuit]

Figure 9:
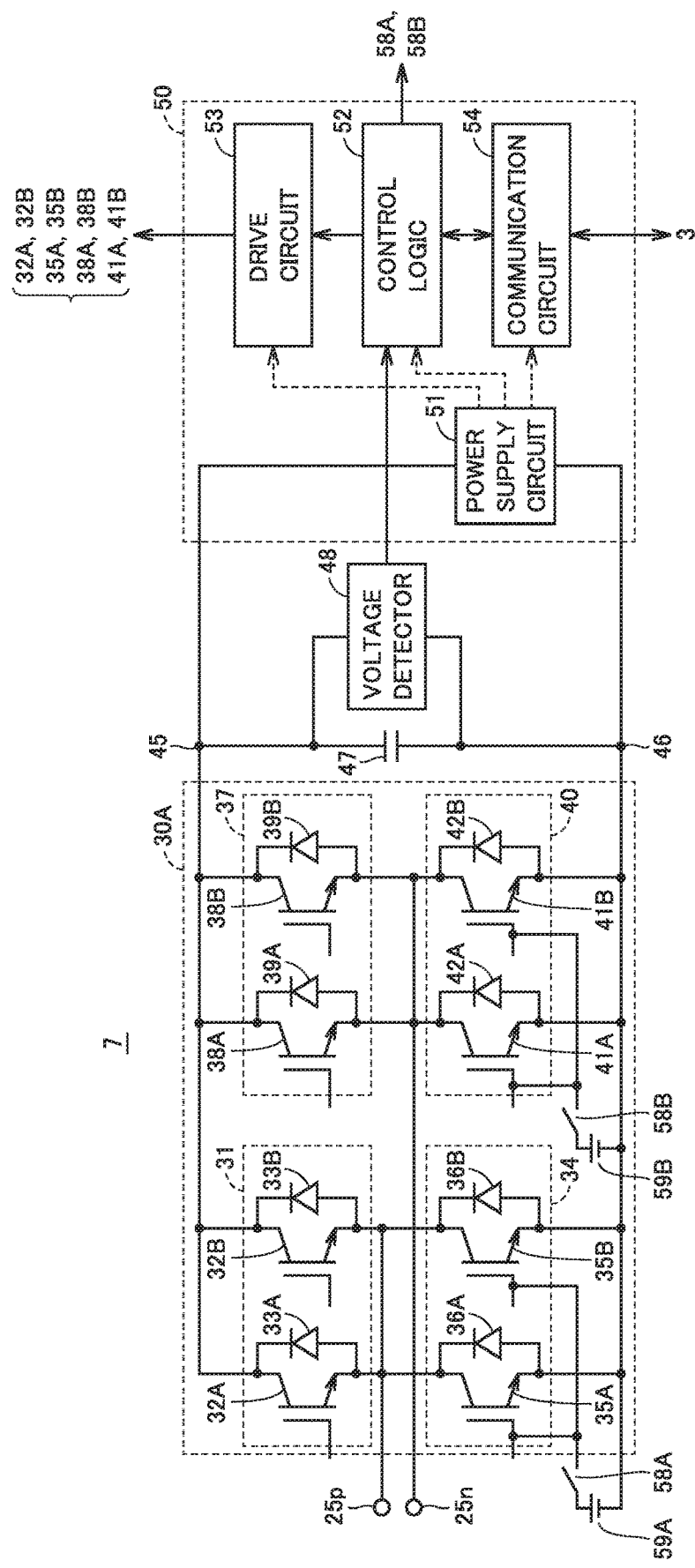
FIG. 9 shows another configuration example of a converter cell forming each leg circuit in FIG. 1.

FIG. 9 shows another configuration example of a converter cell forming each leg circuit in FIG. 1. Converter cell 7 in FIG. 9 is different from converter cell 7 in FIG. 6 in that a full-bridge-type bridge circuit 30A is provided instead of half-bridge-type bridge circuit 30. In the following, the differences from bridge circuit 30 in FIG. 6 are mainly described, and similarities to the case of FIG. 6 are denoted by the same reference characters and are not described repeatedly.

Converter cell 7 in FIG. 9 includes first input/output node 25p, second input/output node 25n, full-bridge-type bridge circuit 30A, DC capacitor 47 serving as an energy storage device, drive controller 50, voltage detector 48, latch-type switches 58A, 58B, and batteries 59A, 59B.

Batteries 59A, 59B are hereinafter referred to collectively as a battery power supply. The battery power supply may be formed of two batteries 59A, 59B as described above, or may be formed of a single battery.

Full-bridge-type bridge circuit 30A includes first arm 31 connected between positive side node 45 and input/output node 25p, second arm 34 connected between negative side node 46 and input/output node 25p, third arm 37 connected between positive side node 45 and input/output node 25n, and fourth arm 40 connected between negative side node 46 and input/output node 25n. First arm 31 and second arm 34 are configured similarly to those in FIG. 6, and thus are not described repeatedly.

Third arm 37 includes semiconductor switching elements 38A, 38B connected in parallel with each other, and diodes 39A, 39B. Diodes 39A, 39B are connected in anti-parallel with switching elements 38A, 38B, respectively. Likewise, fourth arm 40 includes semiconductor switching elements 41A, 41B connected in parallel with each other, and diodes 42A, 42B. Diodes 42A, 42B are connected in anti-parallel with switching elements 41A, 41B, respectively.

While each arm of bridge circuit 30A is provided with two semiconductor switching elements in parallel in the example of FIG. 9, each arm may be provided with more than two semiconductor switching elements in parallel.

When at least one of the plurality of predetermined abnormality modes is detected, control logic 52 turns on all of semiconductor switching elements 35A, 35B forming second arm 34, and turns on all of semiconductor switching elements 41A, 41B forming fourth arm 40. A short circuit is thereby established between input/output nodes 25p and 25n. Specifically, control logic 52 turns on switch 58A to thereby apply a voltage output from battery 59A to the gates of semiconductor switching elements 35A, 35B, and turns on switch 58B to thereby apply a voltage output from battery 59B (or a single battery having commonality with battery 59A) to the gates of semiconductor switching elements 41A, 41B.

Converter cell 7 in FIG. 9 is characterized in that a bypass switch conventionally required to establish a short circuit between input/output nodes 25p and 25n is not provided. By turning on all of semiconductor switching elements 35A, 35B forming second arm 34, and turning on all of semiconductor switching elements 41A, 41B forming fourth arm 40, the same effect as that obtained by conventionally turning on a bypass switch can be provided. In converter cell 7 of the present embodiment, each of second arm 34 and fourth arm 40 is provided with two semiconductor switching elements in parallel. Thus, the possibility of simultaneous failure of both of these two semiconductor switching elements is very low. Accordingly, the semiconductor switching elements can be used instead of the bypass switch.

A short circuit can be established between input/output nodes 25p and 25n also by performing control of turning on all switching elements forming first arm 31 and third arm 37 instead of second arm 34 and fourth arm 40.

[Configuration of Three-Quarter-Type Bridge Circuit]

Figure 10:
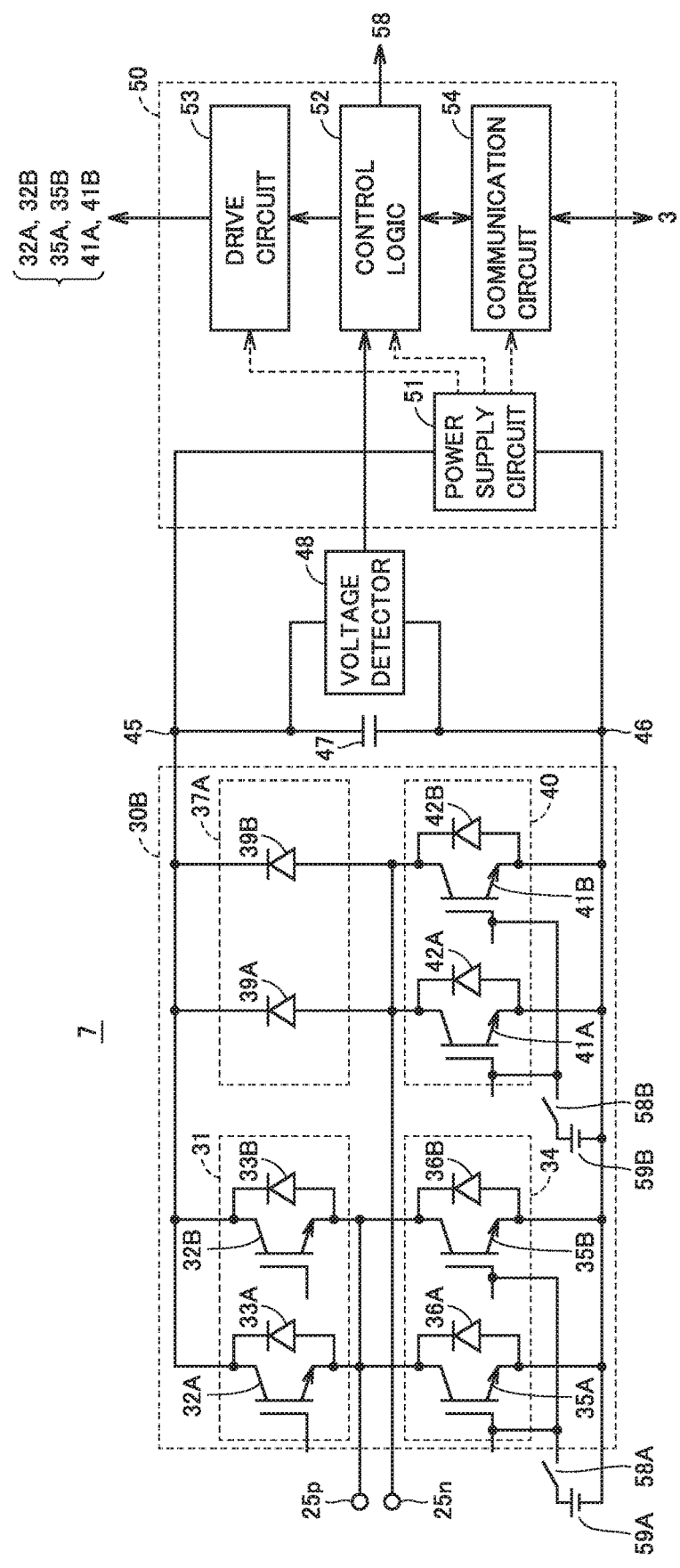
FIG. 10 shows yet another configuration example of a converter cell forming each leg circuit in FIG. 1.

FIG. 10 shows yet another configuration example of a converter cell forming each leg circuit in FIG. 1. Converter cell 7 in FIG. 10 is different from converter cell 7 in FIG. 9 in that a three-quarter-type bridge circuit 30B is provided instead of full-bridge-type bridge circuit 30A.

Specifically, three-quarter-type bridge circuit 30B in FIG. 10 is different from full-bridge-type bridge circuit 30A in FIG. 9 in the configuration of the third arm. More specifically, a third arm 37A in FIG. 10 has a configuration in which semiconductor switching elements 38A, 38B have been removed from third arm 37 in FIG. 9. The configuration in FIG. 10 is otherwise similar to that in FIG. 9, and the same or corresponding parts are denoted by the same reference characters and are not described repeatedly.

Each of arm circuits 5, 6 forming power conversion device 1 may be a mixture of two or three of half-bridge-type converter cell 7, full-bridge-type converter cell 7 and three-quarter-type converter cell 7.

Third Embodiment

In a third embodiment, an example in which the power conversion device described in the first embodiment is applied to a reactive power compensation device referred to as a STATCOM (Static Synchronous Compensator) is described.

Figure 11:
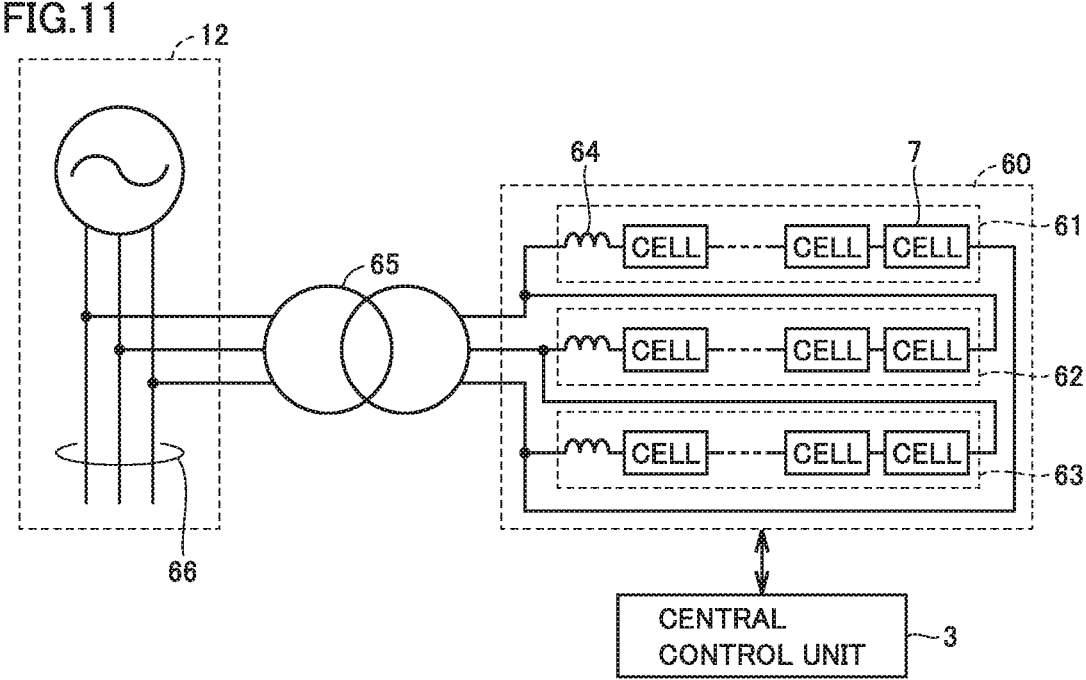
FIG. 11 shows a configuration example of a STATCOM of a Δ connection system.

FIG. 11 shows a configuration example of a STATCOM of a Δ connection system. Referring to FIG. 11, a STATCOM 60 is configured such that arm circuits 61, 62, 63 each formed of a plurality of cascaded converter cells 7 are delta connected. Each of arm circuits 61, 62, 63 may be provided with a reactor 64 in series with converter cells 7. STATCOM 60 is connected through a transformer 65 to a transmission line 66 provided in AC circuit 12 (AC power system).

Each of converter cells 7 forming arm circuits 61, 62, 63 is configured as illustrated in FIG. 9 of the second embodiment. Thus, switching elements 35A, 35B, 41A, 41B forming the lower arm (i.e., second arm 34 and fourth arm 40) of full-bridge-type bridge circuit 30A can be used instead of a conventional bypass switch, and therefore, the volume of converter cell 7 and the cost can be suppressed. In the case of full-bridge-type bridge circuit 30A, switching elements 32A, 32B, 38A, 38B forming the upper arm (i.e., first arm 31 and third arm 37) may be used instead of a conventional bypass switch.

Half-bridge-type bridge circuit 30 illustrated in FIG. 6 may be used, or three-quarter-type bridge circuit 30B illustrated in FIG. 10 may be used, instead of full-bridge-type bridge circuit 30A in FIG. 9. As to the connection of the arm circuits, the Δ connection shown in FIG. 11 may be replaced by a Y connection, or another connection system may be used.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 power conversion device; 3 central control unit; 4, 4u, 4v, 4w leg circuit; 5, 6, 61, 62, 63 arm circuit; 7 converter cell; 8n, 8p, 64 reactor; 12, 12A, 12B AC circuit; 14 DC circuit; 25n second input/output node; 25p first input/output node; 30, 30A, 30B bridge circuit; 31, 34, 37, 40 arm; 32A, 32B, 35A, 35B, 38A, 38B, 41A, 41B semiconductor switching element; 47 DC capacitor; 48 voltage detector; 50 drive controller; 51 power supply circuit; 52 control logic; 53 drive circuit; 54 communication circuit; 58, 58A, 58B switch; 59, 59A, 59B battery; 80B, 80C three-phase transformer; Nn low-potential-side DC terminal; Np high-potential-side DC terminal; Nu, Nv, Nw AC terminal.

The invention claimed is:

1. A power conversion device comprising a plurality of cascaded converter cells,
each of the converter cells including:
a first input/output node;
a second input/output node;
an energy storage device; and
a bridge circuit configured to switch between connection and disconnection between the first and second input/output nodes and the energy storage device, wherein at least one arm of a plurality of arms forming the bridge circuit includes a plurality of semiconductor switching elements connected in parallel,
wherein between the first input/output node and the second input/output node of each of the converter cells, no switch is provided other than the semiconductor switching elements forming the bridge circuit,
each of the converter cells further including:
a power supply circuit configured to generate a drive voltage based on a voltage held by the energy storage device,
a drive controller configured to operate according to the drive voltage;
a battery power supply; and
at least one latch-type switch connected between an output of the battery power supply and gates of all semiconductor switching elements provided in the at least one arm, each of the semiconductor elements provided in the at least one arm being capable of establishing a short circuit between the first input/output node and the second input/output node,
wherein when the at least one latch-type switch is turned on, the gate of each semiconductor switching element provided in the at least one arm receives a voltage for turning on the semiconductor switching element,
wherein the drive controller is configured to:
when none of a plurality of predetermined abnormality modes is detected, control the bridge circuit in accordance with an externally provided command; and
when at least one of the plurality of abnormality modes is detected, turn on the at least one latch-type switch,
wherein the plurality of abnormality modes includes a voltage of the energy storage device being outside a predetermined range.

2. The power conversion device according to claim 1, wherein the at least one arm of the plurality of arms forming the bridge circuit includes two semiconductor switching elements connected in parallel as the plurality of semiconductor switching elements.

3. The power conversion device according to claim 1, wherein the plurality of abnormality modes include communication between the drive controller and outside being abnormal.

4. The power conversion device according to claim 1, wherein
the plurality of abnormality modes include the drive voltage generated by the power supply circuit being outside a set range.

5. The power conversion device according to claim 1, wherein:
the bridge circuit includes:
a first arm provided between a positive side node of the energy storage device and the first input/output node; and
a second arm provided between a negative side node of the energy storage device and the first input/output node;
the second input/output node is directly connected to the negative side node of the energy storage device; and
the drive controller is configured to, when at least one of the plurality of abnormality modes is detected, control the bridge circuit such that all semiconductor switching elements forming the second arm are turned on by turning on the at least one latch-type switch.

6. The power conversion device according to claim 5, wherein:
the at least one latch-type switch includes
a first latch-type switch connected between the output of the battery power supply and a gate of each of the plurality of semiconductor switching elements forming the second arm; and
the drive controller is configured to, when at least one of the plurality of abnormality modes is detected, control the brides circuit such that all semiconductor switching elements forming the second arm are turned on by turning on the first latch-type switch.

7. The power conversion device according to claim 1, wherein;
the bridge circuit includes:
a first arm provided between a positive side node of the energy storage device and the first input/output node;

a second arm provided between a negative side node of the energy storage device and the first input/output node;

a third arm provided between the positive side node of the energy storage device and the second input/output node; and a fourth arm provided between the negative side node of the energy storage device and the second input/output node; and the drive controller is configured to, when at least one of the plurality of abnormality modes is detected, control the bridge circuit such that all semiconductor switching elements forming the second arm and the fourth arm are turned on by turning on the at-least one latch-type switch.

8. The power conversion device according to claim 7, wherein:

the at least one latch-type switch includes:

a first latch-type switch connected between the output of the battery power supply and a gate of each of the plurality of semiconductor switching elements forming the second arm; and a second latch-type switch connected between the output of the battery power supply and a gate of each of the plurality of semiconductor switching elements forming the fourth arm; and the drive controller is configured to, when at least one of the plurality of abnormality modes is detected, control the bridge circuit such that all semiconductor switching elements forming the second arm are turned on by turning on the first latch-type switch, and control the bridge circuit such that all semiconductor switching elements forming the fourth arm are turned on by turning on the second latch-type switch.

9. The power conversion device according to claim 1, wherein:

the bridge circuit includes:

a first arm provided between a positive side node of the energy storage device and the first input/output node;

a second arm provided between a negative side node of the energy storage device and the first input/output node;

a third arm provided between the positive side node of the energy storage device and the second input/output node; and a fourth arm provided between the negative side node of the energy storage device and the second input/output node; and the drive controller is configured to, when at least one of the plurality of abnormality modes is detected, control the bridge circuit such that all semiconductor switching elements forming the first arm and the third arm are turned on by turning on the at least one latch-type switch.

10. The power conversion device according to claim 1, further comprising a central control unit configured to:

transmit a control command and an operation/stop command to each of the converter cells;

acquire information about a number of failed cells which have been short-circuited between the first input/output node and the second input/output node due to detection of any of the plurality of abnormality modes; and when the number of failed cells exceeds a predetermined threshold value, stop operation of the power conversion device.

11. A reactive power compensation device comprising the power conversion device according to claim 1.

12. A power conversion device comprising:

a plurality of cascaded converter cells each including:

an energy storage device; and a bridge circuit wherein at least one arm forming the bridge circuit includes a plurality of semiconductor switching elements connected in parallel;

a power supply circuit configured to generate a drive voltage based on a voltage held by the energy storage device;

a drive controller configured to operate according to the drive voltage;

a battery power supply; and at least one latch-type switch connected between an output of the battery power supply and a gate of each of the plurality of semiconductor switching elements, wherein the drive controller is capable of outputting an ON command to the at least one latch-type switch, to thereby perform control operation capable of closing each of the plurality of semiconductor switching elements when a failure has not occurred in each of the plurality of semiconductor switching elements, and the drive controller is configured to detect an abnormality when a failure has occurred in any of the plurality of semiconductor switching elements and a failure has not occurred in the other of the plurality of semiconductor switching elements, and perform the control operation in response to the detection of the abnormality.

13. The power conversion device according to claim 12, wherein:

the energy storage device is a DC capacitor; and the drive controller is configured to, based on a voltage of the DC capacitor, detect the abnormality when a failure has occurred in any of the plurality of semiconductor switching elements and a failure has not occurred in the other of the plurality of semiconductor switching elements.

14. The power conversion device according to claim 12, wherein the drive controller is configured to detect the abnormality when a failure has occurred in any of the plurality of semiconductor switching elements, and perform the control operation in response to the detection of the abnormality.

15. The power conversion device according to claim 12, wherein the plurality of semiconductor switching elements are switched on and off based on a voltage command value from a central control unit when the abnormality is not detected.

* * * * *